United States Patent [19]
Jones et al.

[11] Patent Number: 4,694,690
[45] Date of Patent: Sep. 22, 1987

[54] MEASURING DISPLACEMENT BETWEEN TWO RELATIVELY MOVABLE STRUCTURES

[75] Inventors: Robert Jones, Cambridge; Keith W. Jones, Histon; William R. S. Baxter, Cambridge, all of England

[73] Assignee: Pandrol Limited, London, England

[21] Appl. No.: 891,652

[22] Filed: Jul. 30, 1986

[30] Foreign Application Priority Data

Aug. 2, 1985 [GB] United Kingdom ............... 8519473
Jul. 3, 1986 [GB] United Kingdom ............... 8616298

[51] Int. Cl.⁴ .......................................... G01M 19/00
[52] U.S. Cl. .................................... 73/146; 250/226; 250/227
[58] Field of Search ........................... 73/146; 33/287; 250/227, 226

[56] References Cited

U.S. PATENT DOCUMENTS 4,103,547  8/1978  Vrabel .................................. 73/146
4,173,073  11/1979  Fukazawa ........................... 73/146
4,225,238  9/1980  Rottenkolber ..................... 73/146
4,391,134  7/1983  Theurer et al. ..................... 73/146

FOREIGN PATENT DOCUMENTS 2016684  9/1979  United Kingdom .
2025608  1/1980  United Kingdom .

OTHER PUBLICATIONS

"A Comparison of Conventional and Optical Fibre Sensors" by R. Jones et al., paper delivered in Norway at Conference on Automation for Safety in Shipping and Offshore Petroleum Operations, Jun. 25–26, 1985, published by Hoberg & Helli A.S. of Oslo, Norway.

Primary Examiner—Donald O. Woodiel
Attorney, Agent, or Firm—Norbert P. Holler

[57] ABSTRACT

An apparatus for use in measuring relative movement between two structures is described. A support (7) having bores for receiving input and output optical fibres (2, 10) is mounted on a plate (24), secured to one of the structures, at a predetermined position using alignment means (50). A filter (8) is fixed relative to the other structure so that light passing down the input fibre (2) passes through the filter (8) to the output fibre (10). The filter comprises a split field filter so that when light of two wavelengths is transmitted via the input fibre (2), the intensity of light at each wavelength transmitted through the filter (8) depends on the position of the filter relative to the support. An analogue output proportional to the displacement is provided using the transmitted intensities. The invention is particularly applicable to measuring displacement of a railway rail with respect to an underlying structure, and a method and installation for this are described.

16 Claims, 11 Drawing Figures

MEASURING DISPLACEMENT BETWEEN TWO RELATIVELY MOVABLE STRUCTURES

This invention relates to measuring displacement between two relatively movable structures. The invention is particularly applicable to measuring movement of a railway rail with respect to an underlying structure, for example a sleeper.

According to a first aspect of the invention, there is provided a method of measuring movement of a railway rail with respect to an underlying structure, wherein a first device is fixed with respect to the rail and a second device is fixed with respect to the underlying structure, one of these devices including a split field filter and the other including first means for directing light at the filter and second means for transmitting light which has passed through the filter, and wherein there is supplied to the first means light of two wavelengths and the light which has passed through the filter, which is affected by the position of the filter with respect to the first and second means, is used to provide a measure of the movement of the rail with respect to the underlying structure.

According to a second aspect of the present invention, there is provided an installation comprising a railway rail supported by an underlying structure, a first device fixed with respect to the rail, a second device fixed with respect to the structure, one of these devices including a split field filter and the other carrying first means for directing light at the filter and second means for transmitting light which has passed through the filter, third means for generating and supplying to the first means light of two wavelengths and fourth means for receiving light transmitted from the second means and using it to provide a measure of the movement of the rail with respect to the underlying structure.

The underlying structure may be a railway sleeper or some other foundation for a railway rail, for example a concrete slab extending along the railway track, or it may be a structure underlying a sleeper or other rail foundation.

It is in principle possible to fix a split field filter to the rail and the first and second means to the underlying structure or to fix the split field filter to the underlying structure and the first and second means to the rail. However, the first of these arrangements is preferred.

In the described embodiment, the first and second means comprise optical fibres.

It is possible to have, to measure movement of one rail with respect to one sleeper, two, three or four sets of split field filter and first and second means. Each set of split field filter and first and second means may have its own third and/or fourth means serving that set alone or a single light generating means and/or single measurement means may serve both or all of the sets of split field filter and first and second means.

Each set of filter and first and second means is termed herein a sensing assembly, and each set of filter and first, second, third and fourth means is termed an optical system.

While it is possible to direct light at the first means in the form of a beam containing simultaneously light at two wavelengths, it is preferable, to increase the sensitivity and stability of the system, to pulse the light supplied to the first means in such a manner that pulses of light at one of the wavelengths alternate with pulses of light at the other of the wavelengths. Preferably, a portion of light approaching the first means is delivered from the first means and used to create a feedback signal to hold the intensity of light at one of the wavelengths supplied to the first mean substantially equal to that at the other of the wavelengths.

As a further improvement, the sum of the intensities of the two wavelengths of light transmitted by the second means via the filter may be held substantially constant, e.g. equal to a reference value. This type of control of intensities enables an analogue output directly proportional to such movement to be produced by the fourth means.

According to a third aspect of the invention, there is provided apparatus for use to measure the relative displacement between two structures, the apparatus comprising:

a first device including transmission means for directing light of two wavelengths from a source and to a sensing means;

a first mounting element for supporting the first device and having alignment means for positioning the first device relative thereto;

a second device including a split field filter;

a second mounting element for supporting the second device;

jig means configured to support the first mounting element to bring it into contact with one of the structures during installation;

a locating member having locating means cooperable with the alignment means of the first mounting element to locate the second mounting element on the other one of the structures at a desired position with respect to the first mounting element, when the latter has been mounted relative to said one of the structures, so that, with the first and second devices supported respectively by the first and second mounting elements, light of two wavelengths transmitted from a source is directed via the filter and transmission means to a sensing means thereby to sense relative displacement between the structure.

Preferably, the jig means is provided with a locking mechanism for retaining it, by means of said other of the structures, in place with the first mounting element in contact with said one of the structures while said first mounting element is secured to that one of the structures.

In one embodiment, the jig means is so configured as to support two such first mounting elements at predetermined positions relative to one another so that the first mounting element can be mounted on said one structure with a predetermined separation so that relative displacement of two parts of the one structure relative to the other structure can be determined.

The locking mechanism may have a fast release manually operable portion whereby, when the apparatus is used to measure the displacement between a railway rail and an underlying structure, the jig can be released quickly in the event of a train using the railway rail during installation.

Preferred embodiments of the present invention provide a sensing system which is portable and rugged and, containing only passive optical components, is suitable for use in almost any environment. The first and second devices may be connected to a remote transceiver unit by optical fibre means so that the unit can be positioned well away from the first and second devices. The transceiver unit is preferably designed to accommodate a plurality of processing modules so that the system can be configured to a particular user's needs. The invention is particularly useful for solving the problem of measuring movement of a rail relative to its supporting sleeper. In a preferred embodiment, the invention is immune to electromagnetic interference, can measure displacements when either of the two components are vibrating at frequencies up to 3 kHz, has a working range of ±1 mm, an accuracy better than 0.01 mm and gives an analogue voltage output proportional to displacement.

For a better understanding of the present invention, and to show how the same may be carried into effect, reference will now be made, by way of example, to the accompanying drawings, in which:

FIG. 2a is a graph of light intensity I against time T;

FIG. 2b shows a view of a split field filter;

Figure 1:
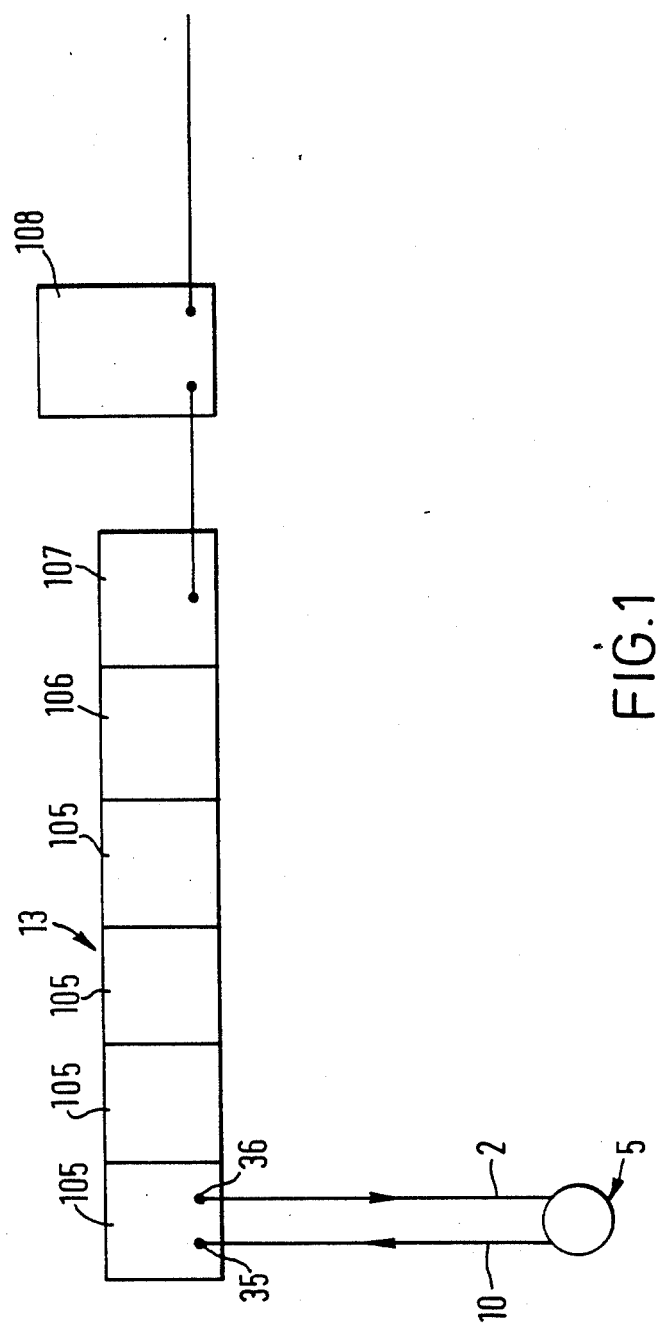
FIG. 1 is a diagram showing the interconnection of components of an optical sensing system.

FIG. 1 shows a transceiver 13 comprising four identical optical modules 105, a display module 106, which displays data obtained from the optical modules 105, and a power module 107, which controls a power supply 108. These modules are shaped to plug into a standard rack mounting. FIG. 1 also shows a sensing assembly 5 which is one of four sensing assemblies each of which is connected to a respective one of the optical modules 105 by way of optical fibres 2 and 10, for example about 20 meters long. The optical fibres 2 are input fibres and are connected to respective sources in the optical modules 105 by way of connectors 36 and the optical fibres 10 are output fibres and are connected to respective detectors in the optical modules 105 by way of connectors 35. The sensing assemblies 5 etc. each include two parts 7 and 8 (FIG. 2) one of which (7) is secured to a first structure, in this example a structure underlying a railway rail, and the other (8) of which is secured to a second structure, in this example the rail, which is movable with respect to the first structure.

The use of optical fibre link means that the system is electronically passive outside the transceiver since no current is transmitted to the sensing assemblies 5 etc. This enables the measurements to be made immune to electromagnetic interference by placing the transceiver in a position that is remote from the railway track.

Figure 2:
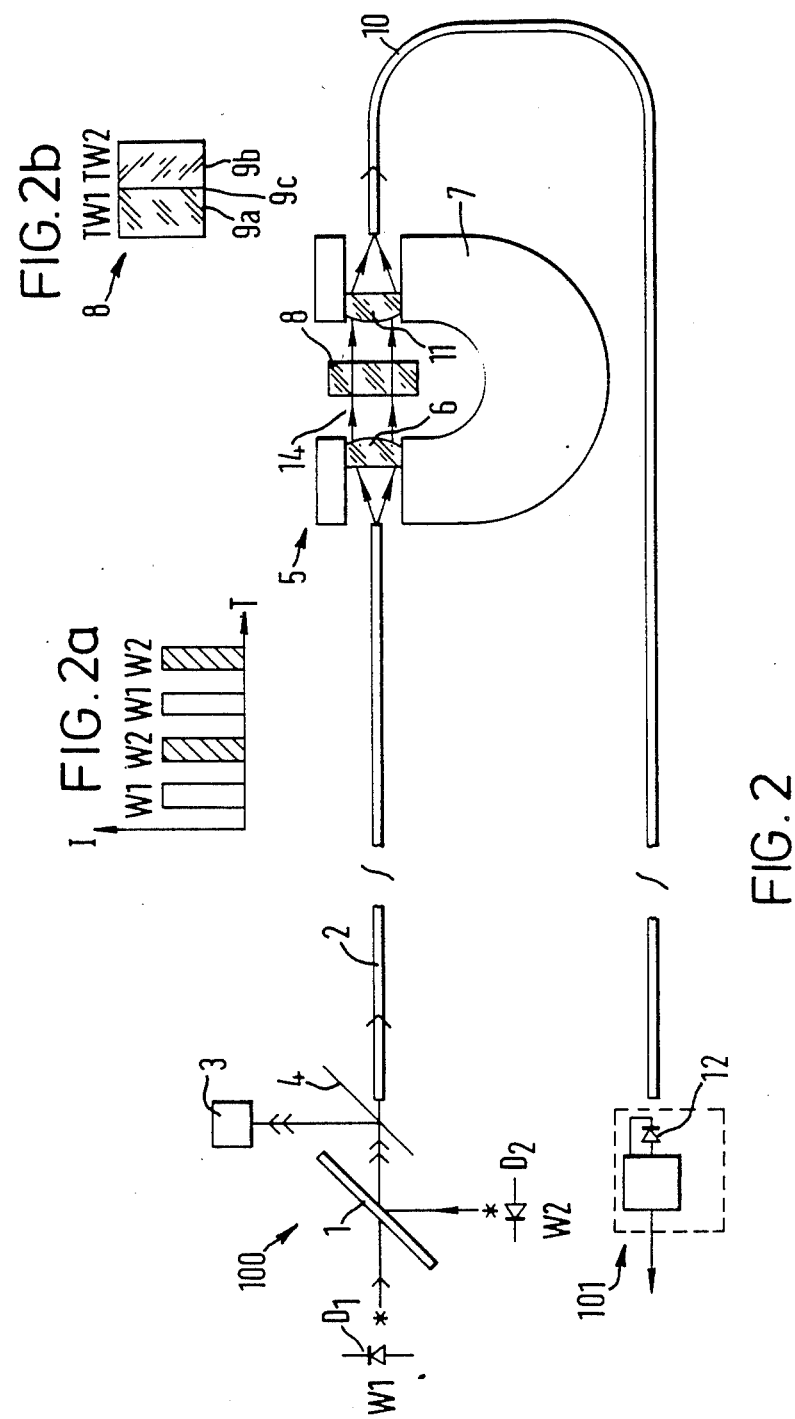
FIG. 2 illustrates diagrammatically optical components of the optical sensing system.

A source 100 and a detector 101, which are parts of an optical module 105, are shown in FIG. 2. At the source, light from two light-emitting diodes (LEDs) $D_1$, $D_2$, time multiplexed to pulse in anti-phase and operating at two differing wavelengths W1 and W2 respectively (W1=730×10$^{-9}$ m, W2=860×10$^{-9}$ m—FIG. 2a), is incident on a dichroic optical component 1, designed to transmit light at wavelength W1 and reflect light at wavelength W2 so that the pulses of light propagate along a common path, i.e. the input fibre 2, in the form of a beam. In addition a small component of the light beam (e.g. 5%) is reflected into a local monitor detector 3 by a neutral density beam splitter 4. The output from the detector 3 drives an equalising feedback loop which holds the electrical power supplied to the two LEDs (and hence the intensities IW1, IW2 of the W1 and W2 pulses) equal, as described in more detail with reference to FIG. 3. The light transmitted by the fibre 2 is coupled into the sensing assembly 5 where it is collimated by a lens 6 that is mounted on a rigid support 7. The collimated beam 14, which is horizontal, is incident upon a split field filter 8 which, as shown in more detail in FIG. 2b, consists of two optical filter portions 9a and 9b joined along a vertical plane 9c to which the axis of the collimated beam is parallel. Each of the optical filter portions may consist of several layers of dielectric, having refractive indices differing from each other, laminated to provide a desired pass band for each filter portion. One filter portion 9a is designed to block transmission at the wavelength W1 whilst allowing transmission at the wavelength W2. The second filter portion 9b has the inverse of this characteristic. Under these conditions the ratio of the intensities, mIW1 and m'IW2, of the light components of the two wavelengths coupled into the output optical fibre 10 by a second lens 11 depends on the position of filter 8 relative to the beam 14 in a direction perpendicular to the plane of the paper considering FIG. 2, that is to say along a horizontal line considering FIG. 2b. The values m, m' are the proportions of the light intensity of wavelengths W1, W2 respectively transmitted by the second lens 11. The output from the output fibre 10 is coupled directly to the detector 101 which includes photodiode 12. A normalised, time demultiplexed voltage output, $V_o$, is derived from the output of the photodiode. $V_o$ is given by $$V_o = k \frac{(mIW1 - m'IW2)}{(mIW1 + m'IW2)}$$

where k is a calibration constant. $V_o$ is linearly proportional to the displacement, d, of filter 8 relative to support 7, in a direction perpendicular to the plane of the paper (FIG. 2) over a range that depends upon the diameter of the collimated beam 14 and the filter dimensions.

Figure 3:
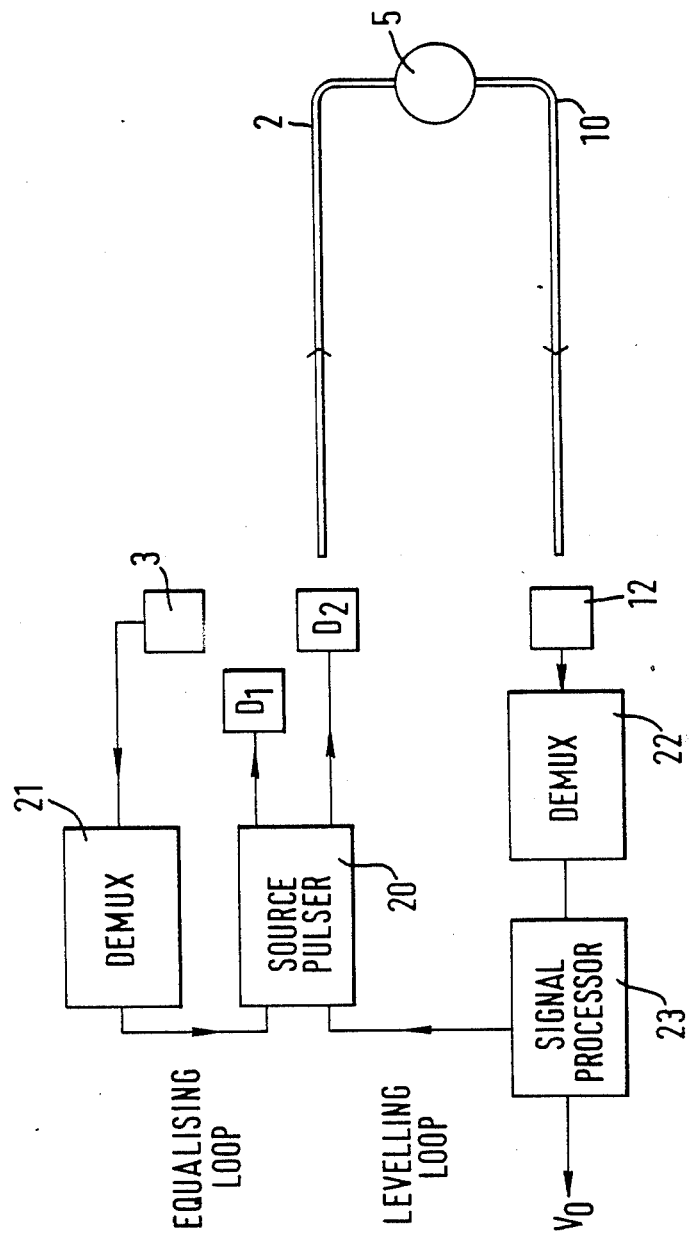
FIG. 3 is a block diagram of signal processing electronics.

FIG. 3 shows a common source pulser 20 which produces a time multiplexed drive signal for the two LEDs $D_1$ and $D_2$. The output from detector 3 is demultiplexed in demultiplexer 21 and supplies an equalising feedback signal to maintain equal the electrical power inputs to $D_1$ and $F_2$ respectively. After transmission through the sensing assembly 5 the light output of output fibre 10 is detected by the photodiode 12 and demultiplexed in demutiplexer 22. The demutiplexer output signal is supplied to a signal processor 23, in which a signal proportional to (mIW1+m'IW2) is compared with a local reference level. The resulting output is used to drive mIW1+m'IW2 to a constant value via the action of a levelling feedback loop incorporating the source pulser 20. Under these conditions $V_o = K \cdot (mIW1 - m'IW2)$, where K is a constant, and the need for analogue division is thereby eliminated. The levelling loops do, however, work relatively slowly and for this reason it can be advantageous to incorporate a high speed analogue divider in each optical module 105. The use of the control loops makes the value of $V_o$ insensitive to all variations in system parameter that have a common effect at both wavelengths. This makes the measurements largely immune to degradation in LED power, common-mode connector losses and fibre perturbations.

Figure 4:
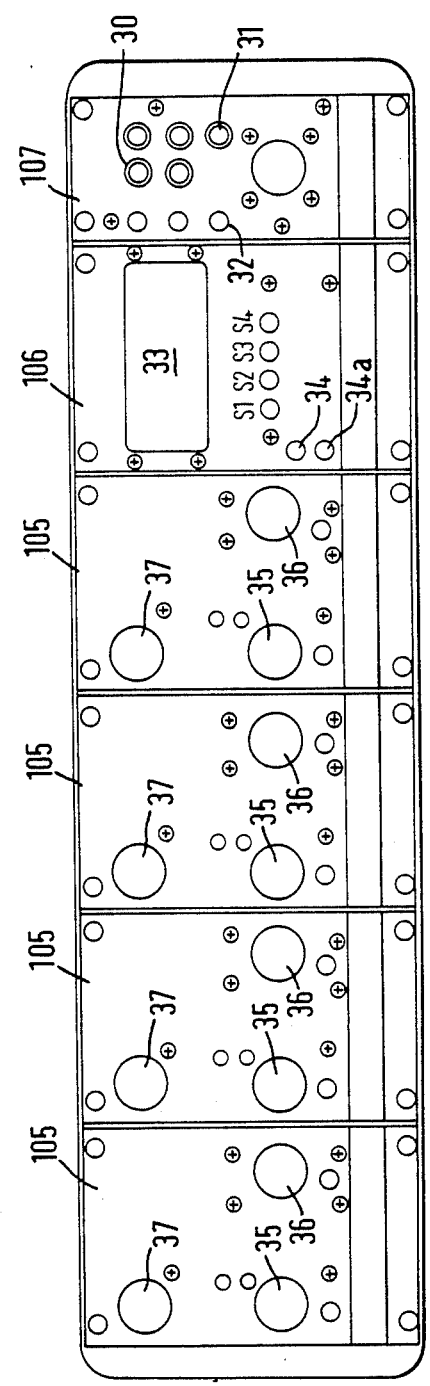
FIG. 4 shows a front panel layout for a transceiver unit.

FIG. 4 again shows the modules 105 to 107. The power module 107 converts a 6 volts direct current voltage supply derived from the power supply 108 (FIG. 1) into a dual 6 volts and 15 volts direct current source. The power module 107 incorporates the timing generator for the clocks that are used to multiplex the light emitting diodes $D_1$, $D_2$. The power module 107 may be used in either the "switched on" (i.e. permanently on) or "timed on" mode. In the latter case the power supply 108 will switch off automatically, five minutes after switch on. This is intended to conserve battery power under conditions where only intermittent use is required. In this mode the power supply will also switch off automatically if either of the power lines drops below the required voltage level during the 5 minute period. Information light emitting diodes 30 may be provided to indicate that the power module is generating the required voltage levels. The light emitting diode 31 adjacent the "timed on" switch 32 is switched on only during the period over which the power is available.

The display module 106 enables the voltage output of any one of a plurality of sensing assemblies 5 to be selected (via channel selection switches S1 to S4) and displayed on a liquid crystal display 33. Two light-emitting diodes 34, 34a are mounted adjacent the channel selection switches and emit green and red light, respectively. Green light will be displayed when the selected sensing assembly 5 is within calibration in its static condition, i.e. when the output of sensing assembly 5 lies within the range +0.6 volts to −0.6 volts. Under these conditions typical relative displacements of the structures will occur over the region of optimum linear response of the sensing assembly. The red light-emitting diode 34a will be displayed if the selected channel is out of calibration. This diagnostic display enables accuracy of the direct current setting of the system to be quickly checked prior to tests. The power supply for the diodes D1, D2 and processor 23 may be automatically or manually switched on and off when a train approaches and leaves the sleeper.

Each optical module 105 has three connector ports. Two of these are optical: (a) a Belling Lee bulkhead connector 35 which couples the output fibre 10 from the sensing assembly 5 to the photodiode 12 and (b) an expanded beam connector 36 which couples the light from the optical module into the input fibre 2. A standard electrical connector 37 is for the output of voltage Vo. The level of the voltage Vo is displayed by the display module 106 and this voltage may be coupled directly to a recorder and oscilloscope for recording and display purposes.

Figure 5:
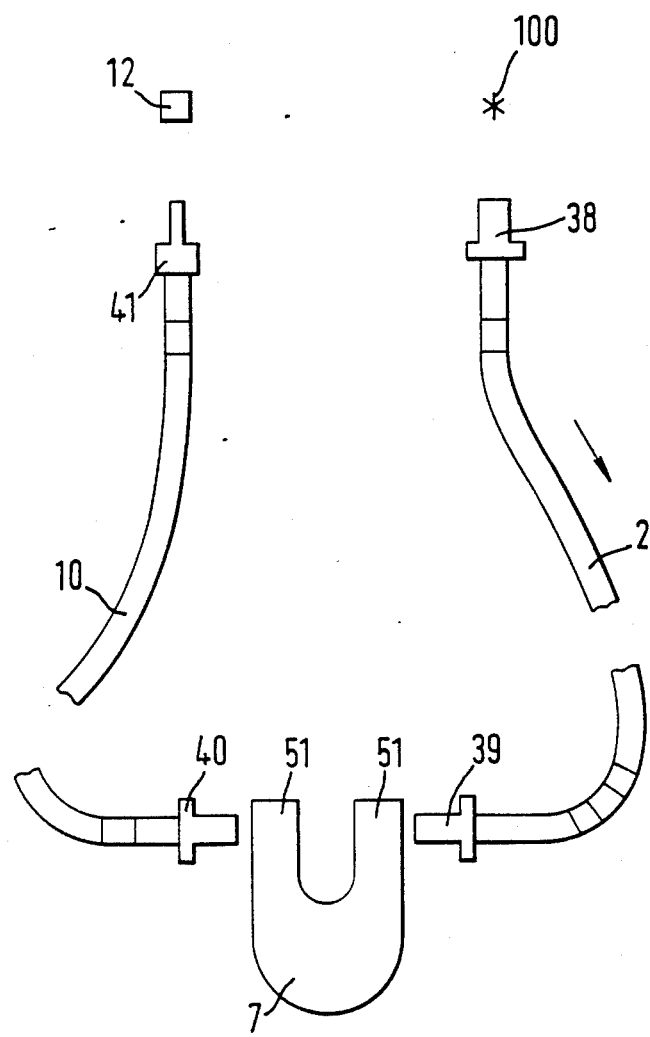
FIG. 5 illustrates optical fibres connected to a support.

Referring now to FIG. 5, the optical fibres 2, 10 are contained within a white outer protective cover of diameter 6 mm. Each input fibre 2 has a beam connector 38, for coupling to connector 36 of the optical module 105, and a beam connector 39 at its output end for connection to the support 7. The beam connectors 38, 39 are designed so that they always adopt the same position when plugged into the optical module or support, as the case may be, to ensure consistent collimation of the light.

Each output fibre 10 has a beam connector 40 at its input end for coupling to the support 7 and a Belling Lee connector 41 to couple it to connector 35 of the optical module 105 and hence to photodiode 12.

In another embodiment (not shown) the input and output fibres are coupled into the support by means of a fibre pigtail and a Stratos in-line connector.

Figure 6:
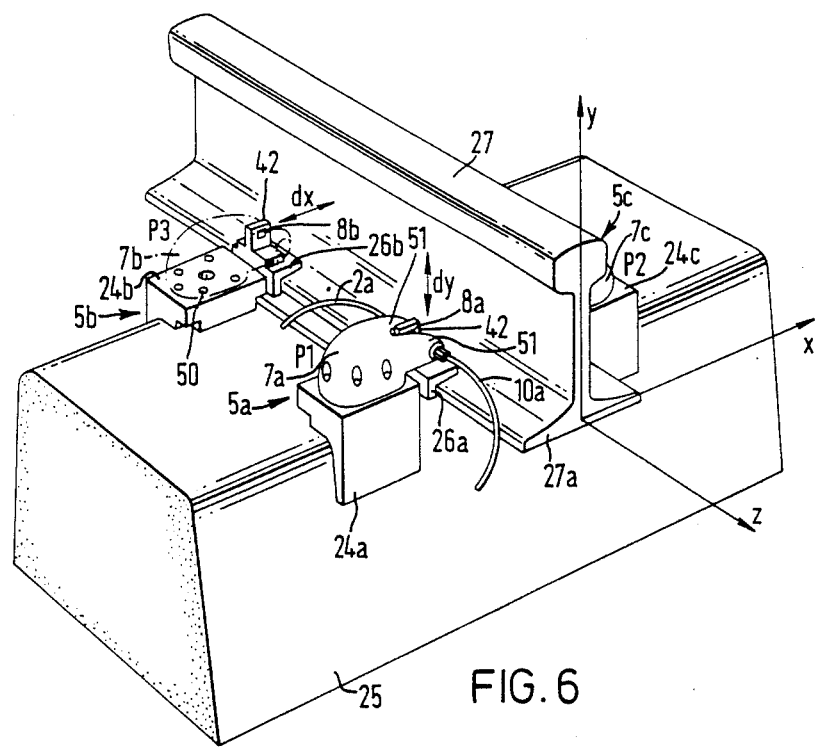
FIG. 6 illustrates an array of three sensing assemblies mounted to measure displacement of a rail.

FIG. 6 shows the way in which an array of three sensing assemblies 5a, 5b, 5c can be mounted on a typical section of railway rail 27 and sleeper 25 to measure railway track deflections. The supports 7a, 7b, 7c are rigidly bolted to first mounting elements 24a, 24b, 24c that are in turn secured to the sleeper 25 by an adhesive. The filters 8a, 8b, 8c (8c not shown) are attached to second mounting elements 26a, 26b (26c not shown) which are secured to the rail 27 by an adhesive.

The filters 8a, 8c have the plane 9c (FIG. 2a) horizontal so that the sensing assemblies 5a, 5c are sensitive to the vertical relative displacement component $d_y$ of the rail 27 with respect to the sleeper 25 measured parallel to the Y axis. The plane 9c of filter 8b lies parallel to the Y, Z plane and so the sensing assembly 5b is sensitive to the horizontal component $d_x$ of relative displacement, measured parallel to the X axis.

Each of the supports 7a, 7b, 7c has a substantially identical mechanical structure which is designed to have a first mechanical resonance at a frequency of about 8 kHz. This is well above the upper limit of the measurement range. The maximum required measurement range is from zero to approximately 3.5 kHz and this is allowed for within the frequency of the electronics.

The outputs of the vertically sensitive displacement sensing assemblies 5a, 5c also enable the tilt T of the rail 27 in the X, Y plane to be measured since $$T = \frac{(d_y)_1 - (d_y)_2}{S_{12}}$$

where
$(d_y)_1$=the relative Y displacement measured at 5a
$(d_y)_2$=the relative Y displacement measured at 5c
and
$S_{12}$=the separation of the sensing assemblies 5a and 5c measured parallel to the X axis.

It is in principle possible to have a fourt sensing asssembly arranged to measure longitudinal deflections of the rail along the Z axis.

Figure 7:
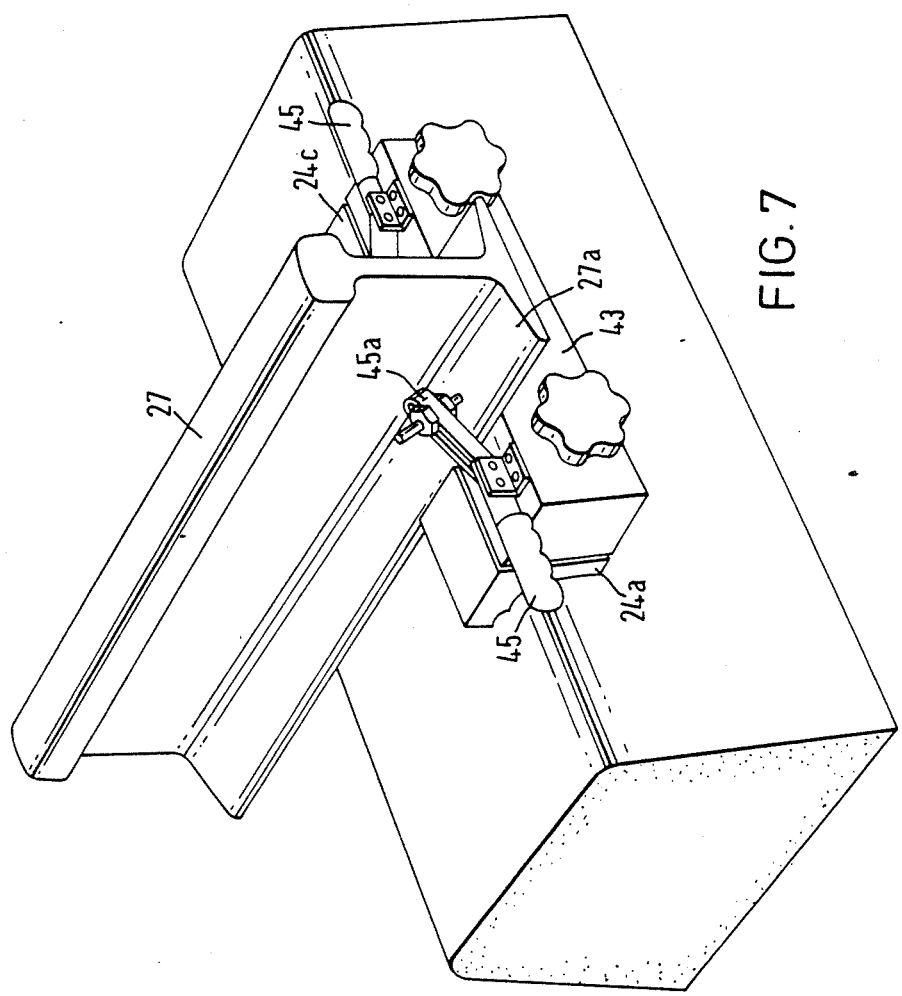
FIG. 7 illustrates a jig means and two first mounting elements during installation of the sensing assemblies of the sensing systems.
Figure 8:
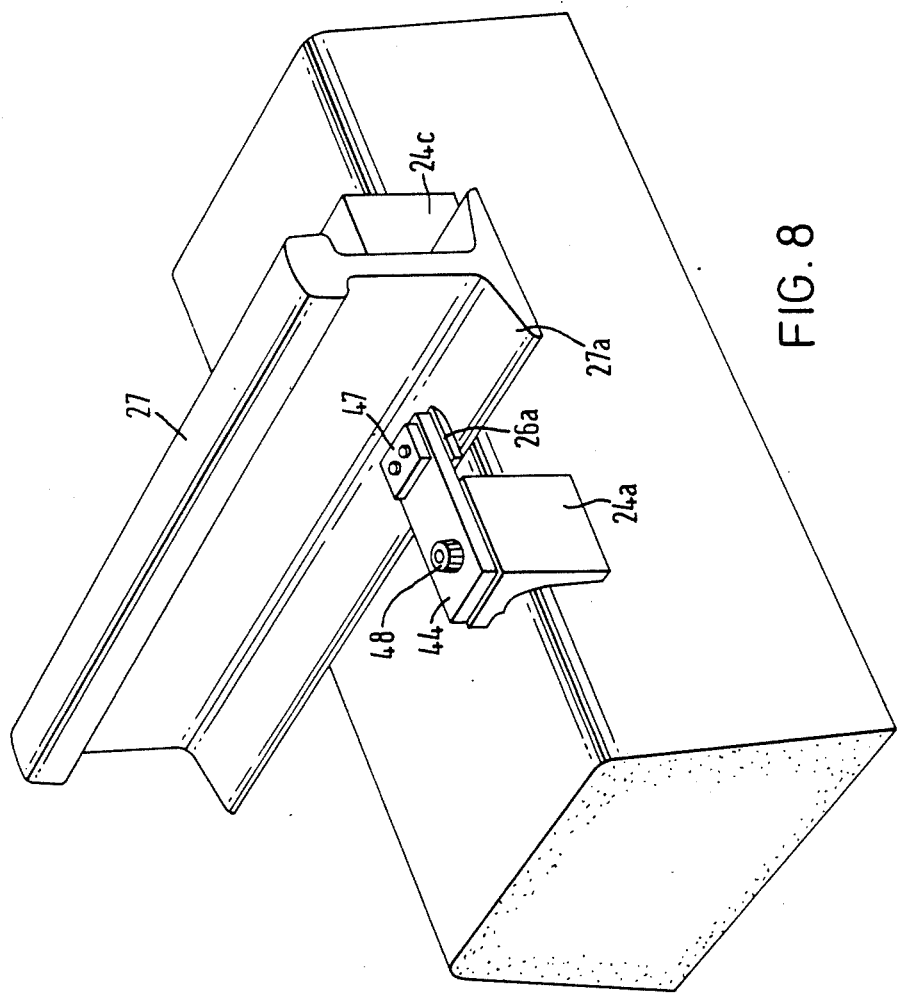
FIG. 8 shows a step during installation to mount a second mounting element.

Referring to FIGS. 6 to 8, each sensing assembly 5a, 5b or 5c of FIG. 6 includes:

(i) a support 7 for carrying the input and output fibres 2, 10;

(ii) a first mounting element 24a, 24b or 24c of substantially L-shaped cross section, for the support 7;

(iii) a second mounting element 26a, 26b or 26c for the filter 8; and (iv) a filter 8 with holder 42 that bolts directly to the second mounting element after the latter is secured to the rail foot.

FIGS. 7 and 8 also show (v) a mounting jig 43 (FIG. 7) for mounting the support 7; and (vi) a locating plate 44 (FIG. 8) for mounting the second mounting element 26a, 26b or 26c.

Referring to the sensing assembly 5a (the other two are similar) the support 7 is rotund at one end and has at the other end two arms 51 each formed with a bore, the axes of the two bores being coincident and parallel to the length of the rail. In each bore is fitted a beam connector 39 or 40 (FIG. 5). Screws secure the support 7a to its first mounting element 24a and those screws and spigots (not shown) project from the support 7a into holes 50 in the first mounting element 24a. Before placing the support 7 on its first mounting element 24a, a locating plate 44 (FIG. 8) is temporarily fixed to the first mounting element 24a, by a screw and spigots in the plate entering the holes 50, and to the second mounting element 26 by further screws, in order to ensure that the mounting element 26a will, when secured to the rail, be so positioned that the filter 8a will occupy the correct position in relation to the beam connectors 39, 40 when the plate is removed and replaced by the support 7a.

The rotund end of each support 7 may be substantially hemispherical and have on its under side a hemispherical cavity. It is important for the supports 7 to have a first resonance frequency above 5 KHz and preferably about 8 KHz or higher if, as is common, the rail vibrates at a number of resonant frequencies up to about 3 KHz and the sleeper vibrates at a number of resonant frequencies lower than those pertaining to the rail.

To position the support and the filters, ballast is dug away alongside the sleeer 25 to a depth of about 150 mm below the rail foot 27a. Then areas of the sleeper 25 and rail foot 27a which are to be used for attaching the first mounting elements 24a etc and second mounting elements 26a etc are cleaned and the mounting elements, sleeper and rail foot are heated using a blow torch. A heated adhesive is then applied to the surfaces and allowed to cool. Two first mounting elements 24a, 24c are fitted onto the mounting jig 43 which is then placed under the rail adjacent the sleeper (FIG. 7).

The sleeper 25 and mounting elements 24a, 24c are heated with a blow torch until the adhesive is seen to flow. The jig 43 is then brought into place quickly, and a locking mechanism comprising toggle clamps 45a pulled down against the rail foot 27a. Additional adhesive can then be run in along the edges of the first mounting elements 24a, 24c, before the joints are allowed to cool. Once the adhesive is set the jig may be removed leaving the first mounting element in place on the sleeper. The locking mechanism has handles 45 which enable the jig to be released quickly should a train use the track during installation.

A second mounting element 26a (FIG. 8) is secured by screws to the locating plate 44 and shims 47 ensuring that the ends of the screws do not protrude below the under surface of the second mounting element. The second mounting element is heated and adhesive applied to it.

The rail foot and second mounting element are heated until the adhesive is seen to flow. At this stage the locating plate 44 is secured by a screw 48 to the first mounting element 24a. The locating plate is located using the holes 50 which act as alignment means. Once the adhesive is hard, the locating plate 44 can be removed leaving the second mounting element 26a in the correct position on the rail foot 27a.

A similar procedure can be followed to mount a further second mounting element 26c and further first and second mounting elements. Holders 42 of filters 8 can then be bolted to their respective second mounting elements.

The optical fibres 2, 10 are threaded under the rail to the required positions and fitted onto the supports 7. Finally, the supports 7 are secured by screws to the first mounting elements at predetermined positions using the holes 50.

Figure 9:
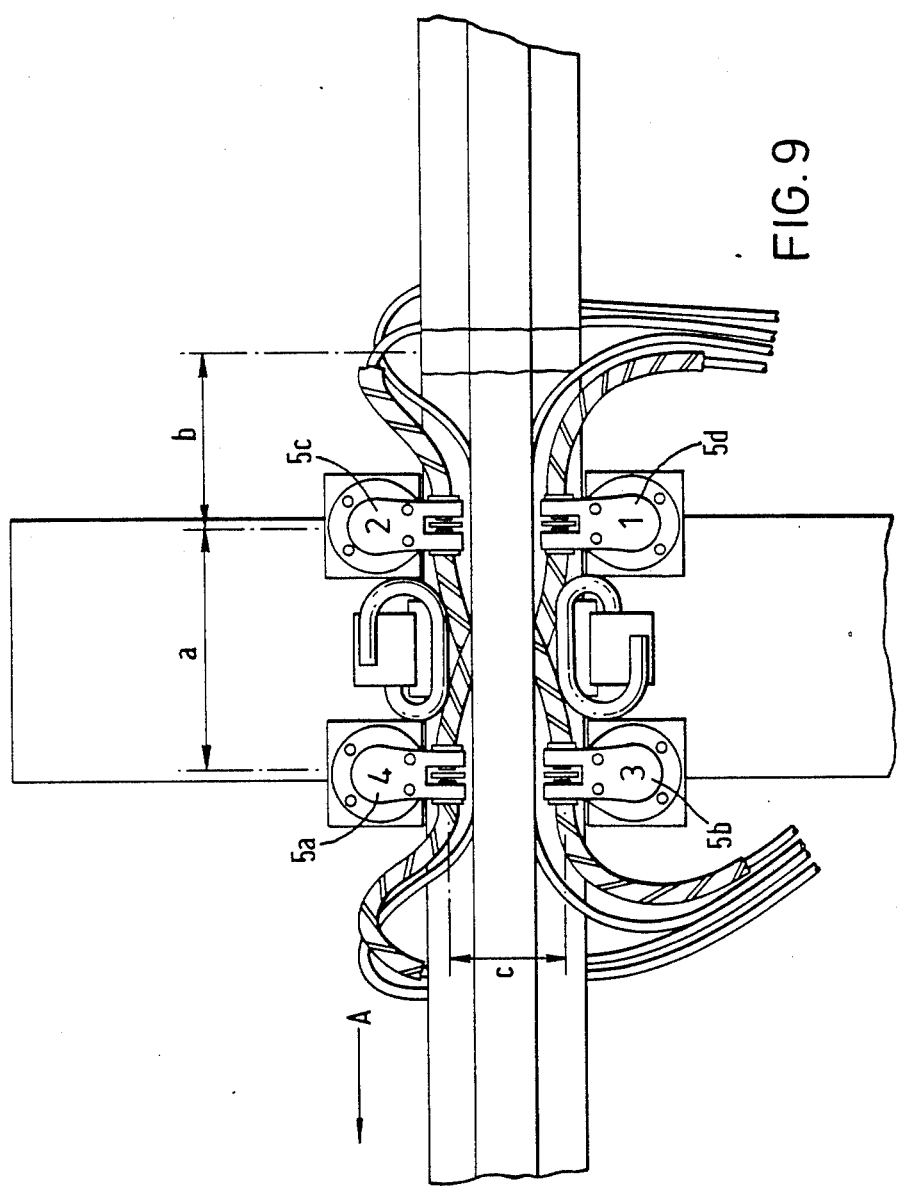
FIG. 9 shows a plan view of an installation including four sensing assemblies.

Four sensing assemblies 5a to 5d are shown in FIG. 9, two with their filters 8 arranged like the filters 8a and 8c and the other two with their filters arranged like the filter 8b of FIG. 6. In FIG. 9, the separation a of the assemblies 5a, 5c is 230 mm, the length b of cable along the rail is 150 m and the width c of the rail is 115 mm. Arrow A designates the running direction. Data can be recorded from the four sensing assemblies. A multichannel recorder (for example using the Racal system) is suitable for this purpose. With the four sensing assemblies for measuring movement of one rail with respect to one sleeper, all kinds of movement of the rail can be measured, including rotational, lateral and skewing.

A calibration jig can be provided to enable the filters 8 to be mounted on a platform driven by a precision X, Y micrometer stage. The support 7 would be mounted on a block attached to a base common to that of the micrometer stages. Under these conditions the filter may be translated by known distance relative to the support and the system thereby calibrated.

We claim:

1. A method of measuring movement of a railway rail with respect to an underlying structure, wherein a first device is fixed with respect to the rail and a second device is fixed with respect to the underlying structure, one of these devices including a split field filter and the other including first means for directing light at the filter and second means for transmitting light which has passed through the filter, and wherein there is supplied to the first means light of two wavelengths and the light which has passed through the filter, which is affected by the position of the filter with respect to the first and second means, is used to provide a measure of the movement of the rail with respect to the underlying structure.

2. A method as claimed in claim 1, wherein pulsed light is supplied to the first means in such a manner that pulses of light at one of the wavelengths alternate with pulses of light at the other of the wavelengths.

3. A method as claimed in claim 1, in which there is provided a feedback signal to hold the intensity of light at one of the wavelengths supplied to the first means substantially equal to that at the other of the wavelengths.

4. A method as claimed in claim 3 in which the sum of the intensities of the two wavelengths of light transmitted by the second means is held substantially constant.

5. An installation comprising a railway rail supported by an underlying structure, a first device fixed with respect to the rail, a second device fixed with respect to the structure, one of these devices including a split field filter and the other carrying first means for directing light at the filter and second means for transmitting light which has passed through the filter, third means for generating and supplying to the first means light of two wavelengths and fourth means for receiving light transmitted from the second means and using it to provide a measure of the movement of the rail with respect to the underlying structure.

6. An installation as claimed in claim 5 in which the third means comprises pulsing means for alternately supplying light at one and then the other of the wavelengths to the first means, there being timing and sensing means arranged to operate in synchronism with the pulsing means to sense light transmitted via the filter.

7. An installation as claimed in claim 5, which includes feedback means for maintaining the intensity of light generated at one of the wavelengths substantially equal to the intensity of light generated at the other of the wavelengths.

8. An installation as claimed in claim 7 which includes means for maintaining the sum of intensities of light sensed at the fourth means at the two wavelengths equal to a predetermined reference value.

9. An installation as claimed in claim 5, in which the fourth means includes means for providing an analogue output proportional to said movement, the output Vo being given by $$V_o = k \frac{mIW1 - m'IW2}{mIW1 + m'IW2}$$

Where IW1, IW2 are the intensitites of the generated light at wavelengths W1, W2 respectively and m, m' are the proportions of that intensity directed to the fourth means via the filter of wavelengths W1, W2 respectively.

10. An installation as claimed in claim 5, which comprises a plurality of sets of first and second devices mounted with their filters so arranged as to measure displacement in at least two mutually orthogonal directions.

11. Apparatus for use to measure the relative displacement between two structures, the apparatus comprising:
   a first device including transmission means for directing light of two wavelengths from a source and to a sensing means;
   a first mounting element for supporting the first device and having alignment means for positioning the first device relative thereto;
   a second device including a split field filter;
   a second mounting element for supporting the second device;
   jig means configured to support the first mounting element to bring it into contact with one of the structures during installation;
   a locating member having locating means cooperable with the alignment means of the first mounting element to locate the second mounting element on the other one of the structures at a desired position with respect to the first mounting element, when the latter has been mounted relative to said one of the structures, so that, with the first and second devices supported respectively by the first and second mounting elements, light of two wavelengths transmitted from a source is directed via the filter to a sensing means thereby to sense relative displacement between the structures.

12. Apparatus as claimed in claim 11, in which the jig means is provided with a locking mechanism for retaining it, by means of said other of the structures, in place with the first mounting element in contact with said one of the structures while said first mounting element is secured to that one of the structures.

13. Apparatus as claimed in claim 12 when used to measure the displacement between a railway rail and an underlying structure, in which the locking mechanism has a fast release manually operable portion whereby the jig means can be released quickly in the event of a train using the railway rail during installation.

14. Apparatus as claimed in claim 11, in which the jig means is so configured as to support two such first mounting elements at predetermined positions relative to one another so that the first mounting elements can be mounted on said one structure with a predetermined separation so that relative displacement of two parts of the one structure relative to the other structure can be determined.

15. Apparatus as claimed in claim 11 when used to measure the displacement between a railway rail and an underlying structure.

16. A method of installing apparatus for measuring the relative displacement between two structures, the method comprising:
   mounting a first mounting element, having alignment means, relative to one of the structures using a jig means configured to support the first mounting element to bring it into contact with said one of the structures;
   using a locating member having locating means cooperable with the alignment means of the first mounting element to locate a second mounting element on the other one of the structures at a desired position with respect to the first mounting element;
   mounting the second mounting element to the other one of the structures at that desired position;
   removing the locating member and securing to the first mounting element at a position determined by the alignment means a first device including transmission means for directing light of two wavelengths from a source and to a sensing means and securing to the second mounting element a second device including a split field filter, so that, with the first and second devices supported respectively by the first and second mounting elements, light of two wavelengths transmitted from a source is directed via the filter to the sensing means thereby to sense relative displacement between the structures.

* * * * *